(12) United States Patent
Granlund et al.

(10) Patent No.: US 9,832,132 B2
(45) Date of Patent: *Nov. 28, 2017

(54) TRANSMISSION OF DELAY TOLERANT DATA

(71) Applicant: NOKIA TECHNOLOGIES OY, Espoo (FI)

(72) Inventors: Seppo Granlund, Helsinki (FI); Arto Karppanen, Helsinki (FI); Enrico Rantala, Iittala (FI); Eero Sillasto, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 84 days.

This patent is subject to a terminal disclaimer.

(21) Appl. No.: 14/801,772

(22) Filed: Jul. 16, 2015

(65) Prior Publication Data

US 2015/0326483 A1 Nov. 12, 2015

Related U.S. Application Data

(63) Continuation of application No. 12/230,407, filed on Aug. 28, 2008, now Pat. No. 9,118,575.

(30) Foreign Application Priority Data

Jun. 30, 2008 (FI) ...................................... 20085676

(51) Int. Cl.
*H04B 1/04* (2006.01)
*H04L 12/851* (2013.01)
(Continued)

(52) U.S. Cl.
CPC .......... *H04L 47/2433* (2013.01); *H04L 47/14* (2013.01); *H04L 47/2416* (2013.01);
(Continued)

(58) Field of Classification Search
CPC . H04L 47/2433; H04L 47/14; H04L 47/2416; H04L 47/2441; H04L 47/283;
(Continued)

(56) References Cited

U.S. PATENT DOCUMENTS 3,778,715 A 12/1973 Schmidt et al.
6,408,007 B1 6/2002 Park
(Continued)

OTHER PUBLICATIONS

Andres Arjona et al., "VoIP Call Signaling Performance and Always-On Battery Consumption in HSDPA, WCDMA and WiFi", 2007, pp. 2964-2967.
(Continued)

*Primary Examiner* — Nguyen Vo
(74) *Attorney, Agent, or Firm* — Squire Patton Boggs (US) LLP

(57) ABSTRACT

Transmission of delay tolerant data. An apparatus includes a processor configured to classify data, on the basis of its delay requirement, into delay tolerant data and into delay critical data, and to control transmission of the delay tolerant data with a transmitter in such a manner that the transmission of the delay tolerant data is timed to coincide with transmission of the delay critical data.

19 Claims, 3 Drawing Sheets

(51) Int. Cl.
*H04L 12/841* (2013.01)
*H04L 12/801* (2013.01)
*H04L 12/853* (2013.01)
*H04L 12/875* (2013.01)
*H04W 52/02* (2009.01)
*H04W 72/12* (2009.01)

(52) U.S. Cl.
CPC ........ *H04L 47/2441* (2013.01); *H04L 47/283* (2013.01); *H04L 47/56* (2013.01); *H04W 52/0216* (2013.01); *H04W 52/0219* (2013.01); *H04W 72/1242* (2013.01); *Y02B 60/50* (2013.01)

(58) Field of Classification Search
CPC .............. H04L 47/56; H04W 52/0216; H04W 52/0219; H04W 72/1242
See application file for complete search history.

(56) References Cited

U.S. PATENT DOCUMENTS

| | | | |
|---|---|---|---|
| 6,411,813 B1 | 6/2002 | Sano | |
| 7,043,671 B2 | 5/2006 | Bader et al. | |
| 7,277,737 B1 | 10/2007 | Vollmer et al. | |
| 7,557,606 B1 | 7/2009 | Chen et al. | |
| 9,118,575 B2 * | 8/2015 | Granlund | H04L 47/14 |
| 2003/0152052 A1 | 8/2003 | Kekki et al. | |
| 2007/0099677 A1 | 5/2007 | Hsu et al. | |
| 2007/0133479 A1 | 6/2007 | Montojo et al. | |
| 2008/0010434 A1 | 1/2008 | Jitsukawa et al. | |
| 2008/0234012 A1 | 9/2008 | Liu et al. | |
| 2009/0059828 A1 | 3/2009 | Kubo | |

OTHER PUBLICATIONS

Henry Haverinen et al., "Energy Consumption of Always-On Applications in WCDMA Networks", 2007, pp. 964-968.
U.S. Office Action U.S. Appl. No. 14/801,769 dated Dec. 15, 2016.
Andres Arjona et al., "VoIP Call Signaling Performance and Always-On Battery Consumption in HSDPA, WCDMA and WiFi", 2007, pp. 2964-2967. No copy provided, per MPEP 609. Copy submitted in parent U.S. Appl. No. 12/230,407.
Henry Haverinen et al., "Energy Consumption of Always-On Applications in WCDMA Networks", 2007, pp. 964-968. copy provided, per MPEP 609. Copy submitted in parent U.S. Appl. No. 12/230,407.
Junshan Zhang et al., "Multi-Access Interference Processes Are Self-Similar in Multimedia CDMA Cellular Networks", pp. 1-29, Mar. 2005.

* cited by examiner

TRANSMISSION OF DELAY TOLERANT DATA

CROSS REFERENCE TO RELATED APPLICATIONS

This is a Continuation of U.S. patent application Ser. No. 12/230,407 filed on Aug. 28, 2008, which claims priority of Finnish Patent Application No. 20085676, filed on Jun. 30, 2008. The disclosures of the prior applications are hereby incorporated by reference herein in their entirety. This application is also related to an application that is being filed the same day as the present application, also claiming the benefit and priority of U.S. patent application Ser. No. 12/230,407 and Finnish Patent Application No. 20085676.

BACKGROUND

Field:

The invention relates to transmission of delay tolerant data.

Description of the Related Art:

Data transmission with various kinds of apparatuses is becoming more and more common. However, data transmission strategies require further development.

SUMMARY

The present invention seeks to provide an improved apparatus, an improved method, an improved computer program, and an improved computer-readable storage medium.

According to an aspect of the present invention, there is provided an apparatus comprising a processor configured to classify data, on the basis of its delay requirement, into delay tolerant data and into delay critical data, and to control transmission of the delay tolerant data with a transmitter in such a manner that the transmission of the delay tolerant data is timed to coincide with transmission of the delay critical data.

BRIEF DESCRIPTION OF THE DRAWINGS

Embodiments of the present invention are described below, by way of example only, with reference to the accompanying drawings, in which.

DETAILED DESCRIPTION

The following embodiments are exemplary. Although the specification may refer to "an" embodiment(s) in several locations, this does not necessarily mean that each such reference is to the same embodiment(s), or that the feature only applies to a single embodiment. Single features of different embodiments may also be combined to provide other embodiments. The present invention is applicable to any data transmission system that supports the functionality that will be described in the following. The protocols and specifications of data transmission systems develop rapidly. Such development may require extra changes to an embodiment. Therefore, all words and expressions should be interpreted broadly and they are intended to illustrate, not to restrict, the embodiment.

Figure 1:
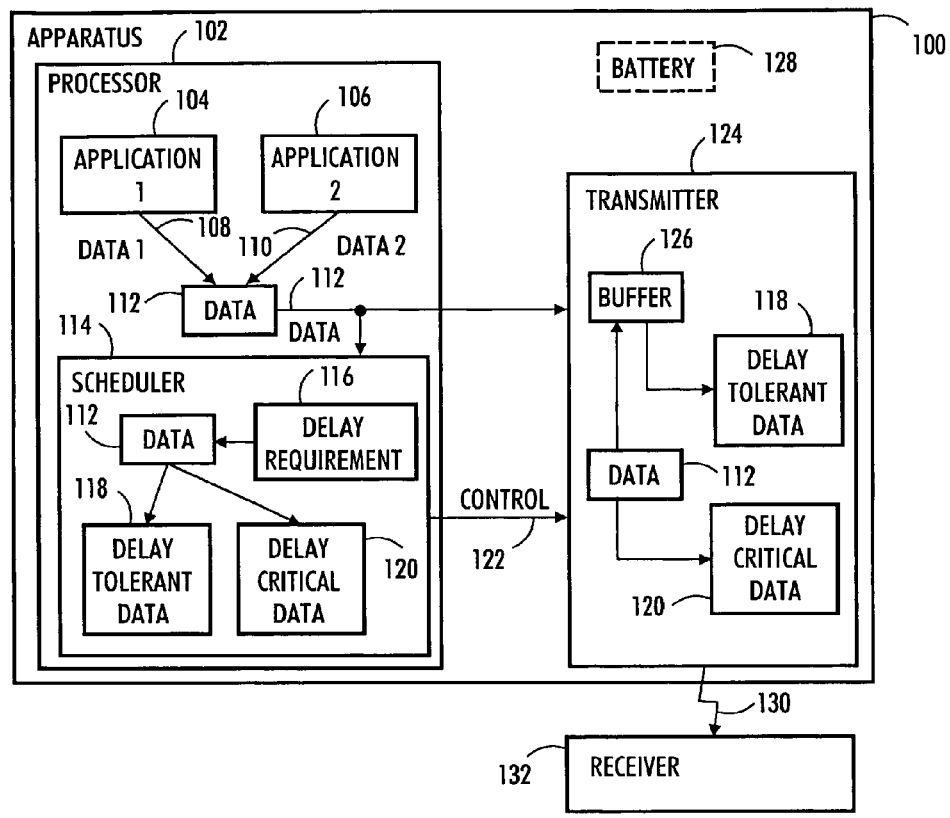
FIG. 1 illustrates embodiments of an apparatus.

FIG. 1 only shows some elements and functional entities, all being logical units whose implementation may differ from what is shown. The connections shown in FIG. 1 are logical connections; the actual physical connections may be different. Interfaces between the various elements may be implemented with suitable interface technologies, such as a message interface, a method interface, a sub-routine call interface, a block interface, or any means enabling communication between functional sub-units. It should be appreciated that apparatuses may comprise other units. However, they are irrelevant to the actual invention and, therefore, they need not be discussed in more detail here. It is also to be noted that although some elements are depicted as separate, some of them may be integrated into a single physical element.

FIG. 1 illustrates embodiments of an apparatus 100. The apparatus comprises a processor 102 configured to classify data 112, on the basis of its delay requirement 116, into delay tolerant data 118 and into delay critical data 120. The processor 102 is also configured to control 122 transmission of the delay tolerant data 118 with a transmitter 124 in such a manner that the transmission of the delay tolerant data 118 is timed to coincide with the transmission of the delay critical data 120. As can be seen from FIG. 1, the delay tolerant data 118 and the delay critical data 120 are transmitted over an air interface 130 to a receiver 132. The classification and the control may be performed in a unit called scheduler 114.

The apparatus 100 may be a mobile terminal or a network element, for example, i.e. the data transmission may be performed in the uplink direction (from the mobile terminal to the network element belonging to the fixed network infrastructure) or in the downlink direction (from the network element to the mobile terminal). In either case, duration of a battery 128 is an ever present problem with wireless mobile terminals. By timing the transmission of the delay tolerant data 118 in such a manner that it coincides with the transmission of the delay critical data 120, the data transmission capacity with one charge of the battery 128 will be maximized. The described timing may save the battery capacity of the mobile terminal both in the transmission of the delay tolerant data 118 and in the reception of the delay tolerant data 118. The network element may be a base station, a base station/radio network controller, a packet control unit, or any other unit capable of performing the described scheduling.

Figure 3:
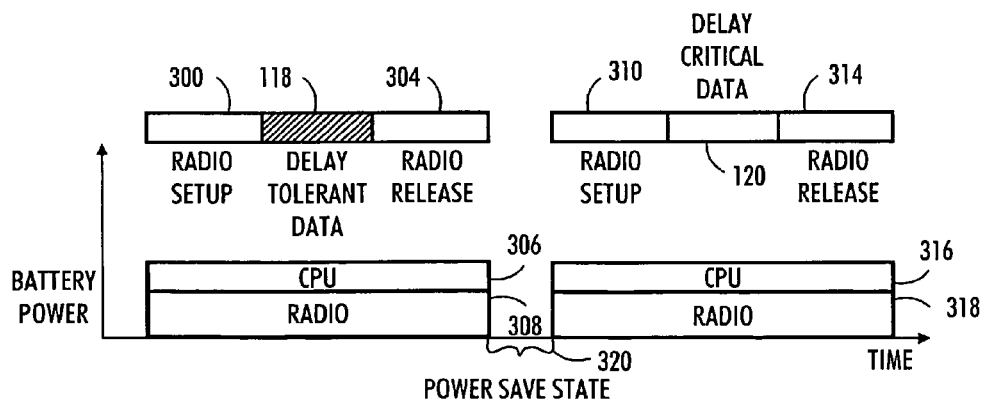
FIGS. 3 and 4 illustrate consumption of battery power.
Figure 4:
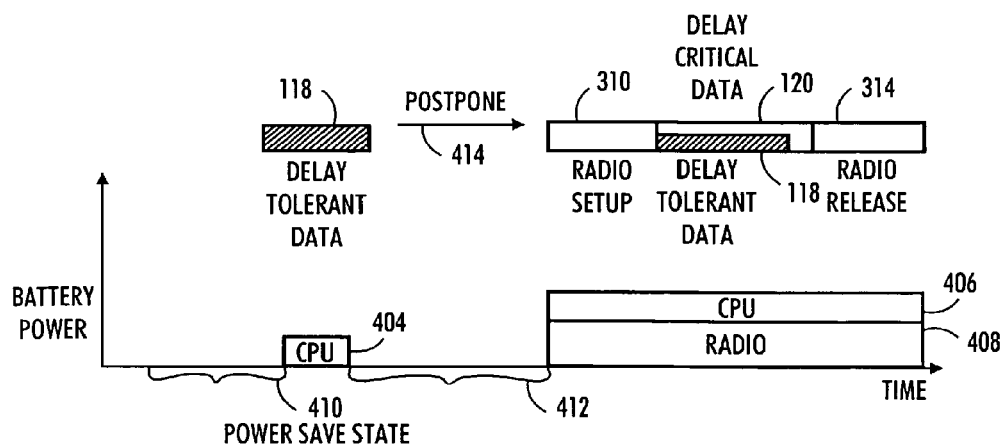

FIGS. 3 and 4 illustrate consumption of battery power. In FIG. 3, delay tolerant data 118 and delay critical data 120 are transmitted separately from each other and sequentially. This causes that each transmission 118, 120 has its own radio setups 300, 310 and radio releases 304, 314. As can be seen, battery power is used by two separate CPU (Central Processing Unit) operations 306, 316 and two separate radio operations 308, 318, and in-between there is only a short power save state 320. In FIG. 4, transmission of the delay tolerant data 118 is postponed 414, whereby the delay tolerant data 118 and the delay critical data 120 are transmitted in parallel. This causes that there is only one radio setup 310 and only one radio release 314. Battery power is now used by a short CPU operation 404, another longer CPU operation 406, and a radio operation 408. There are now two relatively long power save states 410, 412. The solution illustrated in FIG. 4 uses considerably less battery power than the solution illustrated in FIG. 3. In parallel transmission, the radio bearer setup for two packets needs to be done only once instead of two setups of the sequential transmission.

In an embodiment, the processor 102 is configured to control the transmission of the delay tolerant data 118 in such a manner that duration of a power save state of a mobile terminal is maximized.

In an embodiment, the processor 102 is configured to control the transmission of the delay tolerant 118 data in such a manner that the number of radio setups and radio releases is minimized.

In an embodiment, the processor 102 is configured to control the transmission of the delay tolerant data 118 in such a manner that the transmission of the delay tolerant data 118 is in parallel with the transmission of the delay critical data 120. In order to achieve battery power savings, it may be necessary to implement the parallel transmission in the physical layer, so that length of power save state and/or the number of radio setups and releases is optimized. Instead of parallel transmission also sequential transmission may be utilized. The sequential transmission is implemented as illustrated in FIG. 4, i.e. in such a manner that the number of radio setups and releases is minimized and/or the duration of the power save state is maximized. Such sequential transmission is still considered coincident. In sequential transmission, the delay critical data 120 may be transmitted first, and immediately thereupon the delay tolerant data 118. Also other ways to implement the coincident transmission may be utilized.

The data 112 may be wireless packet data. Packets may be generated in such a manner that delays between successive packets are relatively long and there may be high delay variation. After packet generation, the packet needs to be transmitted over a radio interface in uplink or downlink direction. The average data rate over a long period may be relatively small.

Two classes, the delay tolerant data 118 and the delay critical data 120, may be determined in relation to each other, rather than in absolute terms. Common sense may be applied to these definitions: "delay tolerant" implies that more delay is accepted than with "delay critical". "Delay tolerant" may also imply that a relatively large delay variation is accepted.

The delay critical data 120 may be determined from the user's point of view: it may be data the user is not prepared to wait for. The delay critical data 120 may even be real-time or almost real-time data. Voice call, video call, web browsing, VoIP (Voice over Internet Protocol), push-to-talk, and instant messaging may be mentioned as examples of the delay critical data 120. Besides being user data, the delay critical data 120 may also be data of some other type, such as system data. One example of such system data is periodic location update signaling between the mobile terminal and the network element.

The delay tolerant data 118 determined from the user's point of view is data the user is prepared to wait for. The suitable waiting period depends on the type of the data, it could range from seconds to hours, for example. File download, push e-mail, presence information, and calendar data may be mentioned as examples of the delay tolerant data 118.

Another way to define the difference between the delay tolerant data 118 and the delay critical data 120 is to use the Quality of Service (QoS) classes. In UMTS (Universal Mobile Telephone System), an end-to-end service may belong to one of the four QoS classes:

conversational class with real-time delay requirement (voice call, for example);
streaming class with real-time delay requirement (streaming video, for example);
interactive class with best effort delay requirement (web browsing, for example); and
background class with best effort delay requirement (telemetry or emails, for example).

Conversational class and streaming class may belong to the delay critical data 120. Background class may belong to the delay tolerant data 118. Interactive class may belong wholly to the delay tolerant data 120, or then a subdivision may also be made: some aspects of the web browsing belong to the delay critical data 120, whereas other aspect of the web browsing belong to the delay tolerant data 118. Web page fetching may be delay critical as the user is prepared to wait for only a few seconds, whereas with download of a file from a www server the user may be willing to wait even for minutes or longer.

FIG. 1 illustrates that the data 112 may be obtained from one or more applications 104, 106 operating within the processor 102. It may be possible to determine that data 108 generated by a first application 104 belongs to the delay tolerant data 118, and, correspondingly, data 110 generated by a second application 106 belongs to the delay critical data 120, for example. Naturally, it is not necessary that the data 112 is generated within the apparatus 100 at all: it is possible that part of the data 112 or all of the data 112 is generated within another apparatus, and the data 112 is transmitted, by means of telecommunications or a memory, for example, to the apparatus 100.

Typically, data transfer needs are immediate and instantaneous: the sooner, the better. However, a given application 104 may be configured for background transfer. This may be done by the user, via a user interface of the mobile terminal, for example. The user may define "allow calendar synchronization as a background process", "load selected files on background", or "backup your files on background" instead of a default value of immediate action.

In an embodiment, the processor 102 is configured to signal with the transmitter 124 to a receiver 132 that the delay tolerant data 118 is transmitted with a delay exceeding the predetermined delay threshold. The peer application, with which the application 104 of the apparatus 100 is communicating, may need to understand as well that there are breaks in communication between peers, otherwise long scheduling waits (say minutes or tens of minutes) may lead to the termination of the connection and "unwanted break" of sessions. All data transfer may need to be started from the beginning, unless the application 104 has capability to start reasonably after the intermediate break.

What about if all delay tolerant data 118 is not yet transmitted and the transmission of the delay critical data 120 is ended? Such a situation may occur when the user ends a voice call, for example. The transmission of the delay tolerant data 118 may continue in a normal fashion, i.e. without the simultaneous transmission of the delay critical data 120. Another option is to suspend the transmission of the delay tolerant data 118 till transmission of the delay critical data 120 is started again. The application 104 may need to control that a break in the transmission is not too long. Ports may need to be closed after half an hour inactivity for the application 104. If the break is going to become too long, normal transmission may need to be used.

In an embodiment, the processor 102 is configured to classify the data into the delay tolerant data 118 whose delay requirement exceeds a predetermined delay threshold and into the delay critical data 120 whose delay requirement falls below the predetermined delay threshold. The delay threshold may be determined with units of time, such as seconds or minutes, for example.

Figure 2:
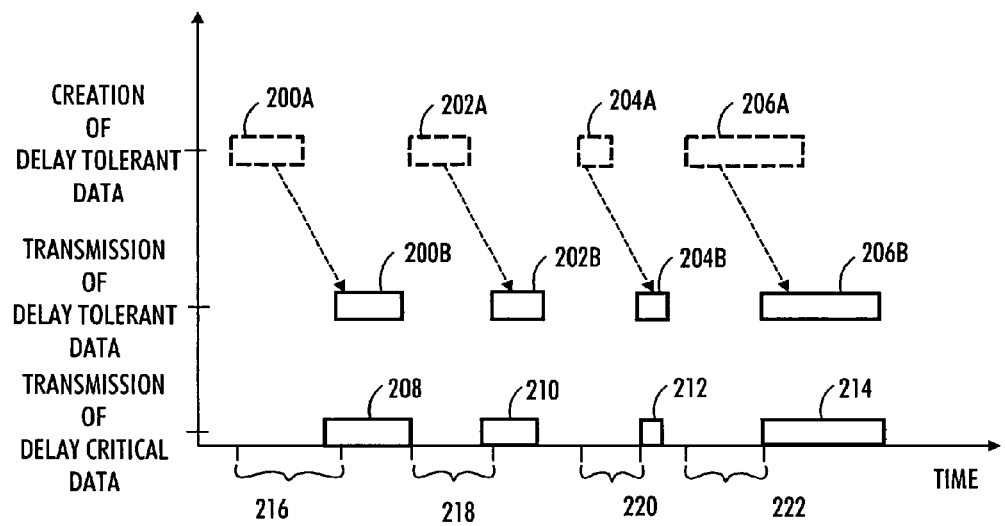
FIG. 2 illustrates timing of transmission.

In an embodiment, the processor 102 is configured to time the transmission of the delay tolerant data 118 in such a manner that the transmission of the delay tolerant data 118 is postponed to coincide with the transmission of the delay critical data 120. FIG. 2 illustrates timing of transmission. Broken line boxes 200A, 202A, 204A, 206A illustrate created pieces of delay tolerant data 118. As can be seen from FIG. 2, the transmission of the delay tolerant data 118 is postponed, i.e. the created pieces 200A, 202A, 204A, 206A of the delay tolerant data 118 are transmitted later, this is illustrated with boxes 200B, 202B, 204B, 206B, which coincide with transmitted pieces 208, 210, 212, 214 of the delay critical data 120. Delays 216, 218, 220, 222 from the starting time of the creation of the pieces 200A, 202A, 204A, 206A to the starting time of the transmission of the pieces 200B, 202B, 204B, 206B vary. A careful study of FIG. 2 reveals that "coincide" means substantially simultaneous transmission of the delay tolerant 118 and the delay critical data 120, i.e. the transmission of the delay tolerant data 118 need not necessarily start exactly at the same time as the transmission of the delay critical data 120, nor need they stop at the same time.

In an embodiment, the apparatus 100 may comprise a buffer 126 configured to store the delay tolerant data 118. The processor 102 may be configured to control the transmission of the delay tolerant data 118 in such a manner that, at the transmission time of the delay critical data 120, a part of the delay tolerant data 118 fitting with the simultaneous transmission of the delay critical data 120 is taken out from the buffer 126. The filling of the buffer 126 may be controlled to prevent it from requiring too much memory space. The application 104 may inform or it may be asked whether there is delay tolerant data 118 to be transmitted. The scheduler 114 may even inform the application 104 whether the buffer 126 is capable of storing any delay tolerant data 118, or whether delaying of transmission is possible. If the buffer 126 becomes excessively full, the scheduler 114 may control 122 the transmitter 124 to transmit the delay tolerant data 118, or a portion of it, even without its transmission coinciding with the transmission of the delay critical data 120.

The mobile terminal presents information to the user and allows the user to input information. In other words, the mobile terminal may be any terminal capable of wirelessly receiving information from and/or wirelessly transmitting information to a (cellular) radio system. The mobile terminal may refer to a portable mobile communication device operating with or without a subscriber identification module (SIM), including, but not limited to, devices of the following type: mobile phone, smartphone, personal digital assistant (PDA), user equipment, or any other portable communication device possibly including computer functionalities or functionalities of other data processing devices.

The wireless connection 130 may be implemented with a wireless transceiver operating according to the GSM (Global System for Mobile Communications), WCDMA (Wideband Code Division Multiple Access), WLAN (Wireless Local Area Network) or Bluetooth® standard, or any other suitable standard/non-standard wireless communication means. Besides being implemented in a radio system with a fixed network infrastructure, the embodiments may be applied to ad hoc communication network as well. In an ad hoc communication network, a mobile terminal equipped with a short-range wireless transceiver operating without a fixed network infrastructure may communicate with another mobile terminal.

The apparatus 100 may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions. If the apparatus 100 is the mobile terminal, the electronic digital computer may naturally be miniaturized.

An embodiment provides a computer program comprising program code means for performing any of the earlier described operations when the program is run on the processor 102.

The computer program may be in source code form, object code form, or in some intermediate form, and it may be stored in some sort of carrier, which may be any entity or device capable of carrying the program, such as a computer-readable storage medium. Such carriers include a record medium, a computer memory, a read-only memory, an electrical carrier signal, a telecommunications signal, and a software distribution package, for example. Depending on the processing power needed, the computer program may be executed in a single electronic digital computer or it may be distributed amongst a number of computers.

The processor 102 may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus 100, necessary processing capacity, production costs, and production volumes, for example. The scheduler 114 may also be implemented as a software module in a radio modem coupled with the transmitter 124.

Figure 6:
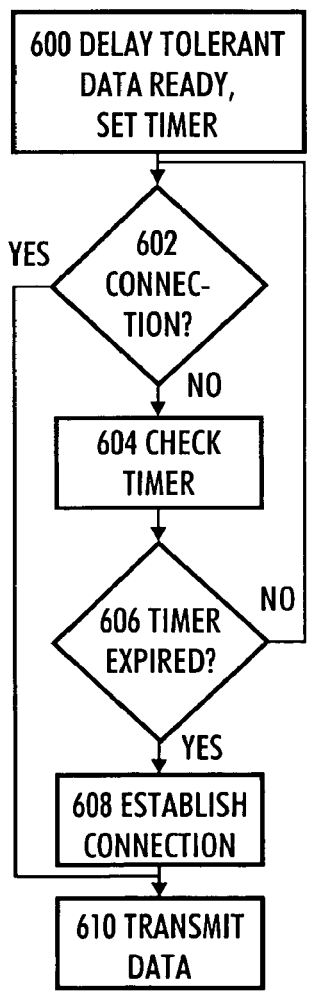
FIG. 6 illustrates the use of a timer.

In an embodiment, the processor 102 is configured to start a timer when detecting the delay tolerant data, and if the timer expires before the transmission of the delay tolerant data 118 is possible simultaneously with the transmission of the delay critical data 120, to control the transmitter 124 in such a manner that the transmission of the delay tolerant data 118 is performed irrespective of the transmission of the delay critical data 120. In effect, the timer may be provided for such situation wherein there is no invocation of a real-time service during a long period. The best effort data may then be transmitted in a normal fashion after the timer expiration. FIG. 6 illustrates an embodiment of timer usage. In 600, delay tolerant data 118 is ready to be transmitted, and the timer is set (a timeout is set). In 602, a check is made: is there a connection (used to transmit delay critical data 120) available. If such a connection is available, 610 is entered and the delay tolerant data 118 is transmitted simultaneously with the delay critical data 120. If such a connection is not available, 604 is entered. In 604, the timer is checked. The expiration of the timer is checked in 606: if the timer is not yet expired, 602 is entered again, else, 608 is entered in order to establish a connection (irrespective of the transmission of the delay critical data 120) and only the delay tolerant data 118 is transmitted.

Next, a method will be described with reference to FIG. 5. The method relates to transmission of delay tolerant data. The method starts in 500 and ends in 510. Other operations, besides those described in FIG. 5, may also be executed between the operations or within the operations. The operations described in FIG. 5 are in no absolute chronological order, and some of the operations may be performed simultaneously or in an order differing from the given one.

In 502, data is classified, on the basis of its delay requirement, into delay tolerant data and into delay critical data. In 504, transmission of the delay tolerant data is timed to coincide with transmission of the delay critical data.

Figure 5:
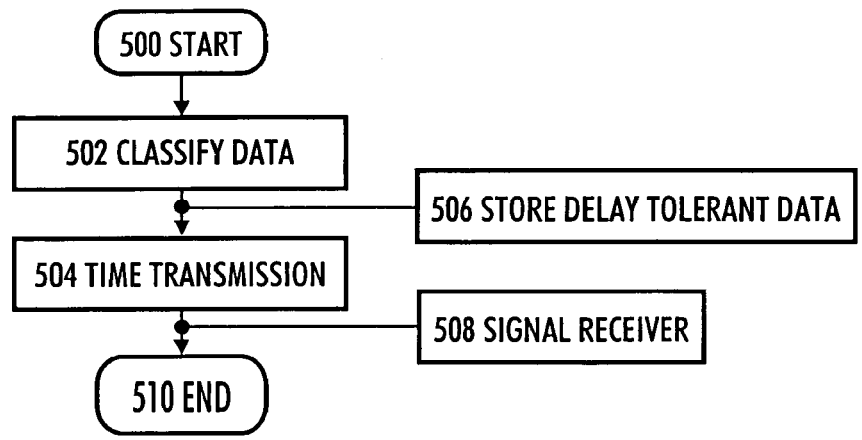
FIG. 5 illustrates embodiments of a method.

The method illustrated in FIG. 5 may be enhanced with single features described earlier, or with a any feasible combination of those features. FIG. 5 illustrates just two of those embodiments. In an embodiment 506, the delay tolerant data is stored into a buffer, and the transmission of the delay tolerant data is timed in such a manner that, at the transmission time of the delay critical data, a part of the delay tolerant data fitting with the simultaneous transmission of the delay critical data is taken out from the buffer. In an embodiment 508, it is signaled to a receiver that the delay tolerant data is transmitted with a delay exceeding the predetermined delay threshold.

It will be obvious to a person skilled in the art that, as technology advances, the inventive concept can be implemented in various ways. The invention and its embodiments are not limited to the examples described above but may vary within the scope of the claims.

We claim:

1. An apparatus comprising:
   a processor configured to classify data, on the basis of the data's delay requirement, into delay tolerant data and into delay critical data, and to control transmission of the delay tolerant data with a transmitter in such a manner that the transmission of the delay tolerant data is postponed until availability of the delay critical data and to coincide with transmission of the delay critical data; and
   a buffer configured to store the delay tolerant data,
   wherein the processor is further configured to classify the data into the delay tolerant data whose delay requirement exceeds a predetermined delay threshold and into the delay critical data whose delay requirement falls below the predetermined delay threshold.

2. The apparatus of claim 1, wherein the processor is further configured to signal with the transmitter to a receiver that the delay tolerant data is transmitted with a delay exceeding the predetermined delay threshold.

3. The apparatus of claim 1, further comprising a buffer configured to store the delay tolerant data, and wherein the processor is further configured to control the transmission of the delay tolerant data in such a manner that, at transmission time of the delay critical data, a part of the delay tolerant data fitting with the simultaneous transmission of the delay critical data is taken out from the buffer.

4. The apparatus of claim 1, wherein the processor is further configured to control the transmission of the delay tolerant data in such a manner that duration of a power save state of a mobile terminal is maximized.

5. The apparatus of claim 1, wherein the processor is further configured to control the transmission of the delay tolerant data in such a manner that a number of radio setups and radio releases is minimized.

6. The apparatus of claim 1, wherein the processor is further configured to control the transmission of the delay tolerant data in such a manner that the transmission of the delay tolerant data is in parallel with the transmission of the delay critical data.

7. The apparatus of claim 1, wherein the apparatus comprises at least one of a mobile terminal comprising a transmitter, and a network element comprising a transmitter.

8. An apparatus comprising:
   a processor configured to classify data, on the basis of the data's delay requirement, into delay tolerant data and into delay critical data, and to control transmission of the delay tolerant data with a transmitter in such a manner that the transmission of the delay tolerant data is postponed until availability of the delay critical data and to coincide with transmission of the delay critical data; and
   a buffer configured to store the delay tolerant data,
   wherein the processor is further configured to control the transmission of the delay tolerant data in such a manner that, at transmission time of the delay critical data, a part of the delay tolerant data fitting with the simultaneous transmission of the delay critical data is taken out from the buffer, and
   wherein the apparatus comprises at least one of a mobile terminal comprising a transmitter, and a network element comprising a transmitter.

9. The apparatus of claim 8, wherein the processor is further configured to classify the data into the delay tolerant data whose delay requirement exceeds a predetermined delay threshold and into the delay critical data whose delay requirement falls below the predetermined delay threshold.

10. The apparatus of claim 9, wherein the processor is further configured to signal with the transmitter to a receiver that the delay tolerant data is transmitted with a delay exceeding the predetermined delay threshold.

11. The apparatus of claim 8, wherein the processor is further configured to control the transmission of the delay tolerant data in such a manner that duration of a power save state of a mobile terminal is maximized.

12. The apparatus of claim 8, wherein the processor is further configured to control the transmission of the delay tolerant data in such a manner that a number of radio setups and radio releases is minimized.

13. The apparatus of claim 8, wherein the processor is further configured to control the transmission of the delay tolerant data in such a manner that the transmission of the delay tolerant data is in parallel with the transmission of the delay critical data.

14. An apparatus comprising:
   a processor configured to classify data, on the basis of the data's delay requirement, into delay tolerant data and into delay critical data, and to control transmission of the delay tolerant data with a transmitter in such a manner that the transmission of the delay tolerant data is postponed until availability of the delay critical data and to coincide with transmission of the delay critical data; and
   a buffer configured to store the delay tolerant data,
   wherein the processor is further configured to control the transmission of the delay tolerant data in such a manner that a number of radio setups and radio releases is minimized.

15. The apparatus of claim 14, wherein the processor is further configured to classify the data into the delay tolerant data whose delay requirement exceeds a predetermined delay threshold and into the delay critical data whose delay requirement falls below the predetermined delay threshold.

16. The apparatus of claim 15, wherein the processor is further configured to signal with the transmitter to a receiver that the delay tolerant data is transmitted with a delay exceeding the predetermined delay threshold.

17. The apparatus of claim 14, further comprising a buffer configured to store the delay tolerant data, and wherein the processor is further configured to control the transmission of the delay tolerant data in such a manner that, at transmission time of the delay critical data, a part of the delay tolerant data fitting with the simultaneous transmission of the delay critical data is taken out from the buffer.

18. The apparatus of claim 14, wherein the processor is further configured to control the transmission of the delay tolerant data in such a manner that duration of a power save state of a mobile terminal is maximized.

19. The apparatus of claim 14, wherein the processor is further configured to control the transmission of the delay tolerant data in such a manner that the transmission of the delay tolerant data is in parallel with the transmission of the delay critical data.

\* \* \* \* \*